INVENTOR
R. A. MATHER

BY

Harry A. Herbert Jr
ATTORNEY

James S. Shannon
AGENT

INVENTOR
R. A. MATHER
Harry A. Herbert Jr
ATTORNEY
BY
James S. Shannon
AGENT

United States Patent Office 3,402,286
Patented Sept. 17, 1968

3,402,286
APPARATUS FOR PLOTTING THE DERIVATIVE OF A FUNCTION AS A FUNCTION OF THE INDEPENDENT VARIABLE

Robert A. Mather, 37 Dawn Drive, Rome, N.Y. 13440

Filed Sept. 9, 1965, Ser. No. 486,246
3 Claims. (Cl. 235—183)

The invention described herein may be manufactured and used by or for the United States Government for governmental purposes without the payment to me of any royalty thereon.

The purpose of this invention is to provide apparatus for plotting the derivative of a function as a function of the independent variable. More specifically, the purpose is to provide apparatus capable of deriving from a graphically represented function $y=f(x)$ the voltage analogs of the values of the derivative $dy/dx$ for values of the independent variable $x$, and for plotting the values of the derivative as a function of $x$.

Briefly, the apparatus comprises a board provided with a straight line cursor rotatable about a pivot point that is free to move only in directions parallel to rectangular X and Y axes on the board. The graphically represented function $f(x)$ is placed on the board with its X and Y axes parallel to the X and Y axes of the board. Attached to the cursor at its pivot point are two function generators producing direct voltages that are analogs of the tangent and the cosine of the angle between the cursor and the X axis. In addition, a linear function generator produces a direct voltage representing the displacement of the cursor pivot point along the X axis of the board measured from a selected zero reference which may be made to correspond to the Y axis of the $f(x)$ coordinate system. In using the device, an index point on the cursor is moved along the graphical representation of $f(x)$ while keeping the cursor at all times tangent to the curve. The algebraic sum of the linear and cosine function generators then represents the instantaneous value of the independent variable $x$ and is applied to the X input of an X–Y plotter, while the output of the tangent function generator represents the corresponding value of the derivative of $f(x)$ and is applied to the Y input of the X–Y plotter. The result is a curve representing the derivative of $f(x)$ as a function of $x$.

The invention will be explained in more detail with reference to the accompanying drawings in which—

Figures 1, 2:
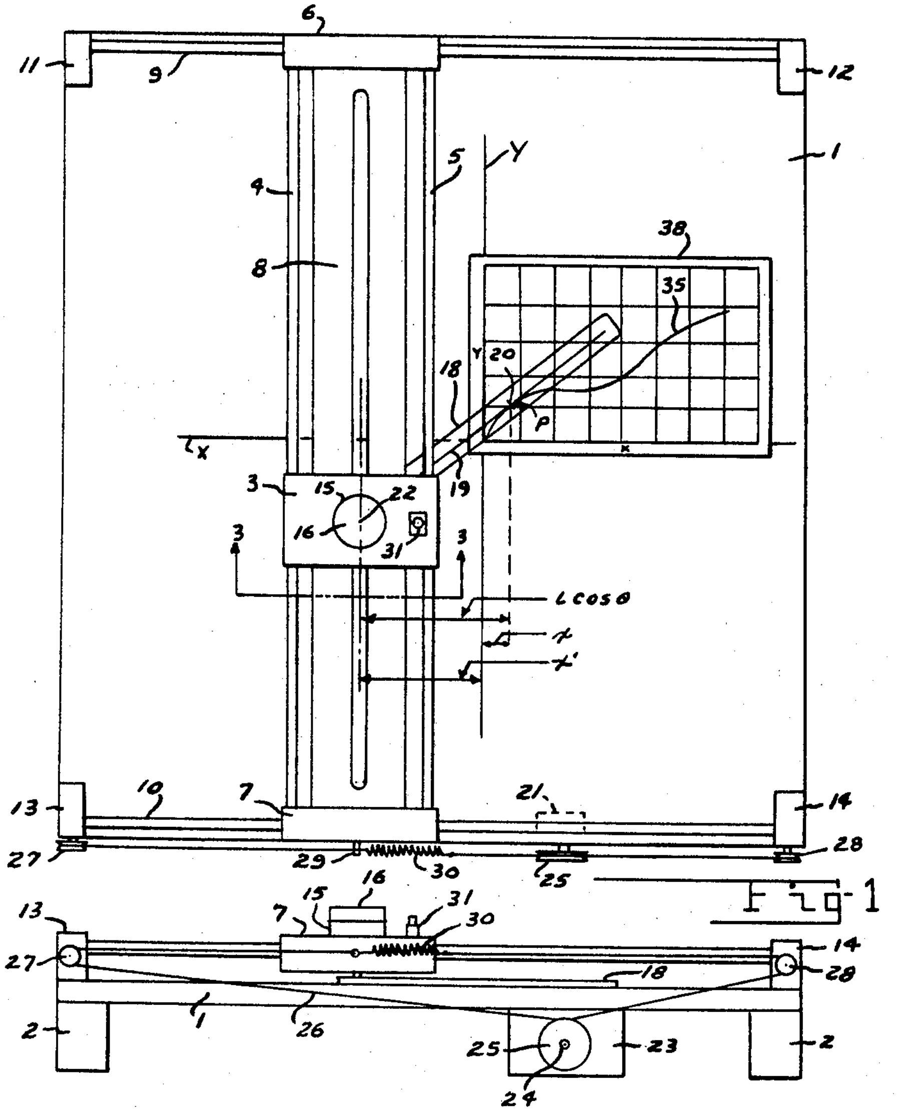
FIG. 1 is a plan view of the apparatus.
FIG. 2 is an elevation of the apparatus.
Figure 3:
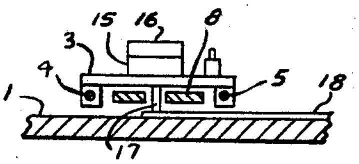
FIG. 3 is a section at location 3—3 in FIG. 1.

Referring to FIGS. 1, 2 and 3, a board 1, supported by legs 2, is shown as having X and Y rectangular axes laid out on its surface. These axes simply may be two intersecting lines of a rectangular grid provided for convenience on the surface of the board. A panel 3 is mounted above the surface of board 1 with two degrees of freedom, one in the direction of the X axis and the other in the direction of the Y axis. The Y direction freedom is provided by having the panel slide on rods 4 and 5 which are mounted in end pieces 6 and 7 separated by strut 8. The X direction freedom is provided by having end pieces 6 and 7 slide on rods 9 and 10 supported by uprights 11–12 and 13–14.

Panel 3 has mounted thereon a pair of ganged concentric rotary cosine and tangent function generators 15 and 16 the common shaft 17 of which extends downward through a slot in strut 8 and terminates in a cursor 18 which slides easily over the surface of the board 1. The cursor may be made of a transparent material such as an acrylic resin and may have an index line 19 on its under side. A second short line 20 at right angles to line 19 may be used to designate an index point point P on line 19. A linear function generator 21, used as seen later to give the position of cursor pivot point 22 along the X axis, is mounted beneath board 1 on panel 23. This function generator may be a linear rotary potentiometer having a shaft 24 with an attached drive pulley 25. A cord 26 is attached to pulley 25 and after making several turns about this pulley in each direction from the point of attachment passes over idlers 27 and 28 to a post 29 on end piece 7. Spring 30 maintains cord 26 in a taut condition. The angular position of either the resistance element or the contact in potentiometer 21 may be made adjustable in order to adjust the zero point, as will be seen later. Element 31 is a push button switch used to lower the normally retracted pen of an X–Y plotter, as will also be explained later.

Figure 4:
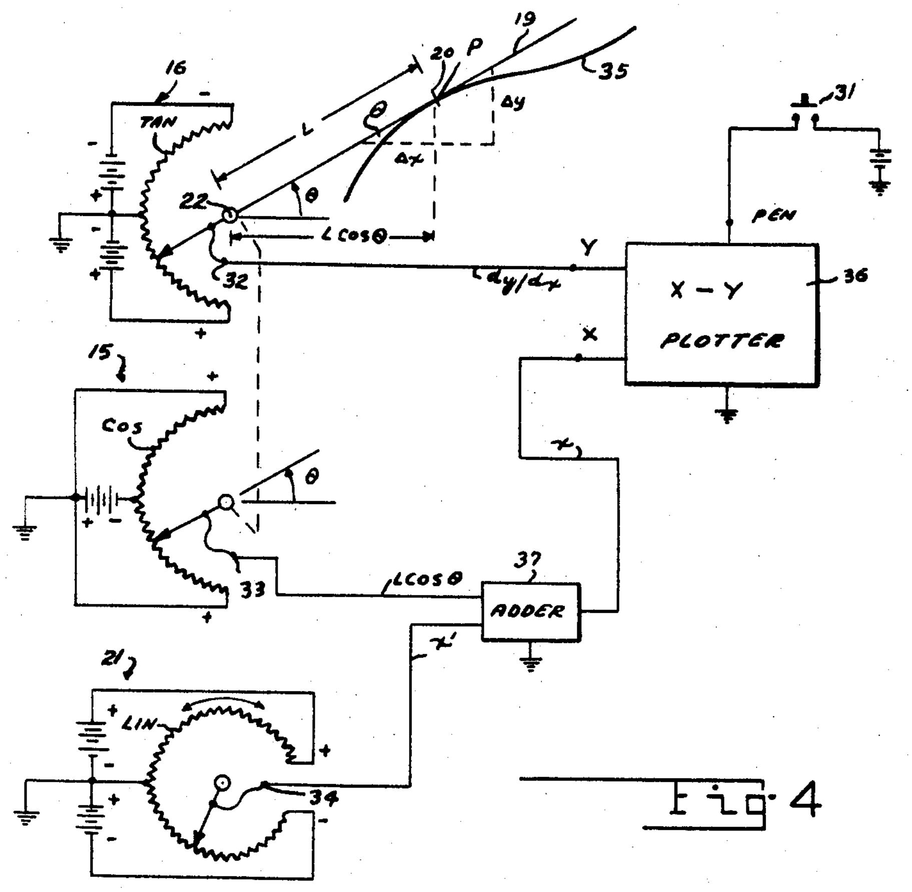
FIG. 4 is a schematic diagram of the apparatus.

Referring to the schematic diagram of the apparatus shown in FIG. 4, function generator 16 is shown as a rotary potentiometer having a resistance distribution such that the voltage between point 32 and ground is an analog of tan $\theta$, $\theta$ being the angle between index line 19 of the cursor and the X direction. If index point P on the cursor coincides with a point on curve 35, which graphically represents a function $y=f(x)$, and if index line 19 is tangent to the curve at that point, then the slope of line 19, or $\Delta y/\Delta x$, equals the derivative $dy/dx$ of the function at that point. Since tan $\theta$ equals the slope of line 19, the voltage at point 32 is an analog of the derivative $dy/dx$.

Function generator 15 is shown as a rotary potentiometer in which the resistance distribution is such that the voltage between point 33 and ground is an analog of cos $\theta$. The distance in the X direction between cursor pivot point 22 and reference point P is $L \cos \theta$, where L is the distance between the pivot point and point P on the cursor. Therefore, since L is a constant, $L \cos \theta$ is proportional to cos $\theta$ and the voltage at point 33 is an analog of $L \cos \theta$.

Finally, function generator 21, shown also as a rotary potentiometer, has a linear resistance element producing a voltage between point 34 and ground that is proportional to the displacement $x'$ (FIG. 1) in the X direction of the pivot point 22 of the cursor from a zero reference corresponding to the grounded tap on the resistance element. The sign of the voltage indicates the sense of this displacement. Either the angular position of the resistance element of potentiometer 21 or the angular position of its contact may be made adjustable in order to position the zero reference at a desired position along the X axis. In FIG. 1 potentiometer 21 has been so adjusted that the zero reference is the Y axis.

The voltage at point 32, which as stated above is an analog of $dy/dx$, is applied to the Y input of X–Y plotter 36. This plotter may be of any suitable type capable of receiving X and Y inputs in the form of direct voltages and of plotting the value of the Y input as a function of the value of the X input in rectangular coordinates. Plotters of this type are commercially available.

Figure 5:
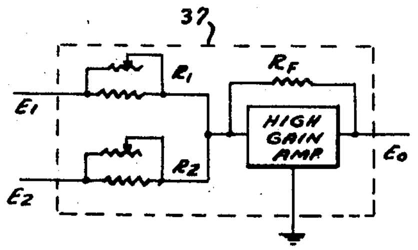
FIG. 5 is a suitable adder for use in FIG. 4.

Since, as stated above, the voltage at point 33 is an analog of $L \cos \theta$ and the voltage at point 34 is an analog of the displacement $x'$ of pivot point 22 from the zero reference (the Y axis in FIG. 1), the algebraic sum of these voltages is an analog of the displacement $x$ of the index point P on the cursor from the $x=0$ or Y axis. This sum is obtained by adder 37 and applied to the X input of X–Y plotter 36. A suitable adder is shown in FIG. 5. The output of this adding circuit is given by the expression $$E_0=-\left(E_1\frac{R_F}{R_1}+E_2\frac{R_F}{R_2}\right)$$

If $R_2=R_1$ this becomes $$E_0=-\frac{R_F}{R_1}(E_1+E_2)$$

and the output is proportional to the sum of $E_1$ and $E_2$. Adding circuits of this type are well known in the art and described in the literature, for example, in vol. 19, Waveforms, of the Radiation Laboratory Series, McGraw-Hill, pages 643–645.

In using the device to plot the derivative of $y=f(x)$ as a function of the independent variable $x$, a sheet 38 of X–Y rectangular coordinate paper, on which the function $y=f(x)$ is graphically represented as a curve 35, is placed on board 1 with its X and Y directions in alignment with the X and Y directions of the board and, preferably, with its origin lying on the zero reference line for potentiometer 21. If index point P of the cursor is then placed on any point of curve 35 with line 19 of the cursor tangent to the curve at that point, the apparatus applies to the Y input terminal of X–Y plotter 36 a voltage proportional to the derivative at that point and to the X input a voltage proportional to the value of the independent variable $x$ at that point. Depressing push button switch 31 then causes the X–Y plotter 36 to record this value of the derivative at the proper point in its X–Y rectangular coordinate system. Repeating this process for a sufficient number of points on curve 35 locates a curve in the X–Y coordinate system of plotter 36 that relates the values of the derivative to the values of the independent variable $x$.

I claim:

1. Apparatus for plotting the derivative of a function $y=f(x)$ as a function of the independent variable $x$, said apparatus comprising: means providing a flat surface having rectangular X and Y directions delineated thereon, upon which surface may be placed a graphical representation of the function $y=f(x)$ plotted in an $x$–$y$ rectangular coordinate system with the $x$ and $y$ axes parallel to said X and Y directions; a cursor slidable over said surface and having an index point located on a straight index line; support means attached to said surface and to said cursor so as to provide a pivotal axis for said cursor normal to said surface, movable over said surface and intersecting said index line at a point removed from said index point; means fixed relative to said surface and actuated by said support means for producing a direct voltage $x'$ proportional to and of the same sign as the displacement measured in said X direction of said pivotal axis from an adjustable X direction zero position; tangent and cosine function generators coupled to said cursor and actuated by its rotation about said pivotal axis to produce direct voltages proportional to and of the same sign as the tangent and the cosine of the angle between said index line and said X direction; a rectangular coordinate plotter having $y$ and $x$ inputs; means for applying said tangent voltage to the $y$ input of said plotter; and means for algebraically adding said cosine voltage and said $x'$ voltage and for applying the sum to the $x$ input of said plotter.

2. Apparatus as claimed in claim 1 in which said support means comprises a first structure restrained by guides attached to said surface to movement in said X direction; a second structure restrained by guides attached to said first structure to movement in said Y direction; and a shaft supported by said second structure and concentric with said pivotal axis, said shaft being attached at one end to said cursor and coupled at the other end to said tangent and cosine function generators.

3. Apparatus as claimed in claim 2 in which said means for producing the voltage $x'$ is coupled for actuation to said first structure.

References Cited

UNITED STATES PATENTS

| | | | |
|---|---|---|---|
| 2,617,587 | 11/1952 | Carpenter | 235—197 |
| 2,875,389 | 2/1959 | Morrill | 235—197 |

MALCOLM A. MORRISON, *Primary Examiner.*

F. D. GRUBER, *Assistant Examiner.*